(12) United States Patent
Matsubara et al.

(10) Patent No.: US 7,364,027 B2
(45) Date of Patent: Apr. 29, 2008

(54) BELT-TYPE CONTINUOUSLY-VARIABLE TRANSMISSION

(75) Inventors: Kenji Matsubara, Kanagawa (JP);
Hiromi Taguchi, Kanagawa (JP);
Yasuhiko Kunii, Kanagawa (JP);
Tomoyuki Watanabe, Tokyo (JP);
Hitoshi Nakata, Kanagawa (JP);
Tetsuya Watanabe, Kanagawa (JP)

(73) Assignee: Jatco Ltd., Shizuoka (JP)

( * ) Notice: Subject to any disclaimer, the term of this patent is extended or adjusted under 35 U.S.C. 154(b) by 288 days.

(21) Appl. No.: 11/084,999

(22) Filed: Mar. 21, 2005

(65) Prior Publication Data

US 2005/0233841 A1   Oct. 20, 2005

(30) Foreign Application Priority Data

Mar. 30, 2004   (JP) .............................. 2004-097883
Mar. 30, 2004   (JP) .............................. 2004-097884

(51) Int. Cl.
*F16H 63/34*   (2006.01)

(52) U.S. Cl. ................................. 192/219.5; 74/606 R
(58) Field of Classification Search .............. 192/219.5
See application file for complete search history.

(56) References Cited

U.S. PATENT DOCUMENTS 4,671,133 A * 6/1987 Yamada ........................ 74/530
5,649,457 A    7/1997 Kodou et al.
7,152,724 B2 * 12/2006 Reed et al. ............... 192/219.5

FOREIGN PATENT DOCUMENTS

JP    3231265 B2   9/2001
JP    3306217 B2   5/2002

* cited by examiner

*Primary Examiner*—Richard M Lorence
(74) *Attorney, Agent, or Firm*—Foley & Lardner LLP

(57) ABSTRACT

A belt-type continuously-variable transmission includes a casing enclosing a primary pulley, a secondary pulley, a belt connecting the pulleys and a parking gear; and a side cover subassembly including a side cover joined to the casing. The side cover assembly further includes a parking pawl arranged to engage with the parking gear, a support member arranged to support the parking pawl; and a return spring.

20 Claims, 7 Drawing Sheets

BELT-TYPE CONTINUOUSLY-VARIABLE TRANSMISSION

BACKGROUND OF THE INVENTION

The present invention relates to a parking mechanism (a mechanism for locking rotation of an output side when the vehicle is stopped) for a belt-type continuously-variable transmission which increases or decreases the speed of rotation of an engine output shaft, and transmits the rotation to an axle of the vehicle.

A patent document 1 (U.S. Pat. No. 5,649,457 corresponding to Japanese Patent No. 3306217) shows a parking mechanism for a belt-type continuously-variable transmission. This parking mechanism includes a parking gear disposed axially between a secondary pulley and an output gear (at a position adjacent to the output gear); a parking pawl arranged to prevent rotation of the output gear by engagement with the parking gear, and swingably supported on a pin which is supported between a casing and a housing; and a return spring wound around the pin to return the parking pawl to an unlocking position. A patent document 2 (Japanese Patent No. 3231265) shows a parking mechanism for an ordinary automatic transmission, which is substantially identical in arrangement to a parking mechanism for a belt-type continuously-variable transmission.

SUMMARY OF THE INVENTION

In the parking mechanism of the document 1, the parking pawl and return spring are both mounted on the pin, and both ends of the pin are supported, respectively, by the casing and the housing. Therefore, the assembly operation of the parking pawl, the return spring and the support pin is not complete until the joining operation of the casing and the housing is completed. That is, parts such as the parking pawl, the return spring and the support pin are not incorporated in one of the casing and the housing. Therefore, this arrangement is inconvenient for the assembly operation and detrimental to the productivity. Moreover, the pin (a support member supporting the parking pawl) must be long enough to support the return spring, and the length of the pin is disadvantages to the size reduction and the optimization of the layout. The parking mechanism of the document 2 has similar drawbacks.

It is, therefore, an object of the present invention to provide a belt-type continuously-variable transmission devised to reduce the size and to facilitate the assembly operation.

According to one aspect of the present invention, a continuously-variable transmission comprises: a primary pulley; a secondary pulley connected with the primary pulley by a belt; a parking gear; a casing enclosing the primary pulley, the secondary pulley and the parking gear; and a side cover subassembly including; a side cover joined with the casing; a parking pawl arranged to engage with the parking gear, and mounted on the side cover; a support member arranged to support the parking pawl, and mounted on the side cover; and a return spring mounted on the side cover.

According to another aspect of the invention, a continuously-variable transmission comprises: a primary pulley; a secondary pulley connected with the primary pulley by a belt; a parking gear; a casing enclosing the primary pulley, the secondary pulley and the parking gear; a parking pawl arranged to engage with the parking gear, and mounted on the side cover; a pawl shaft arranged to support the parking pawl, and mounted on the side cover; and a return spring which is a coil spring to urge the parking pawl in a direction disengaging from the parking gear; and a side cover which is joined with the casing, and arranged to support the pawl shaft, and which includes a spring shaft extending along the pawl shaft, and supporting the return spring.

DETAILED DESCRIPTION OF THE INVENTION

Figure 1:
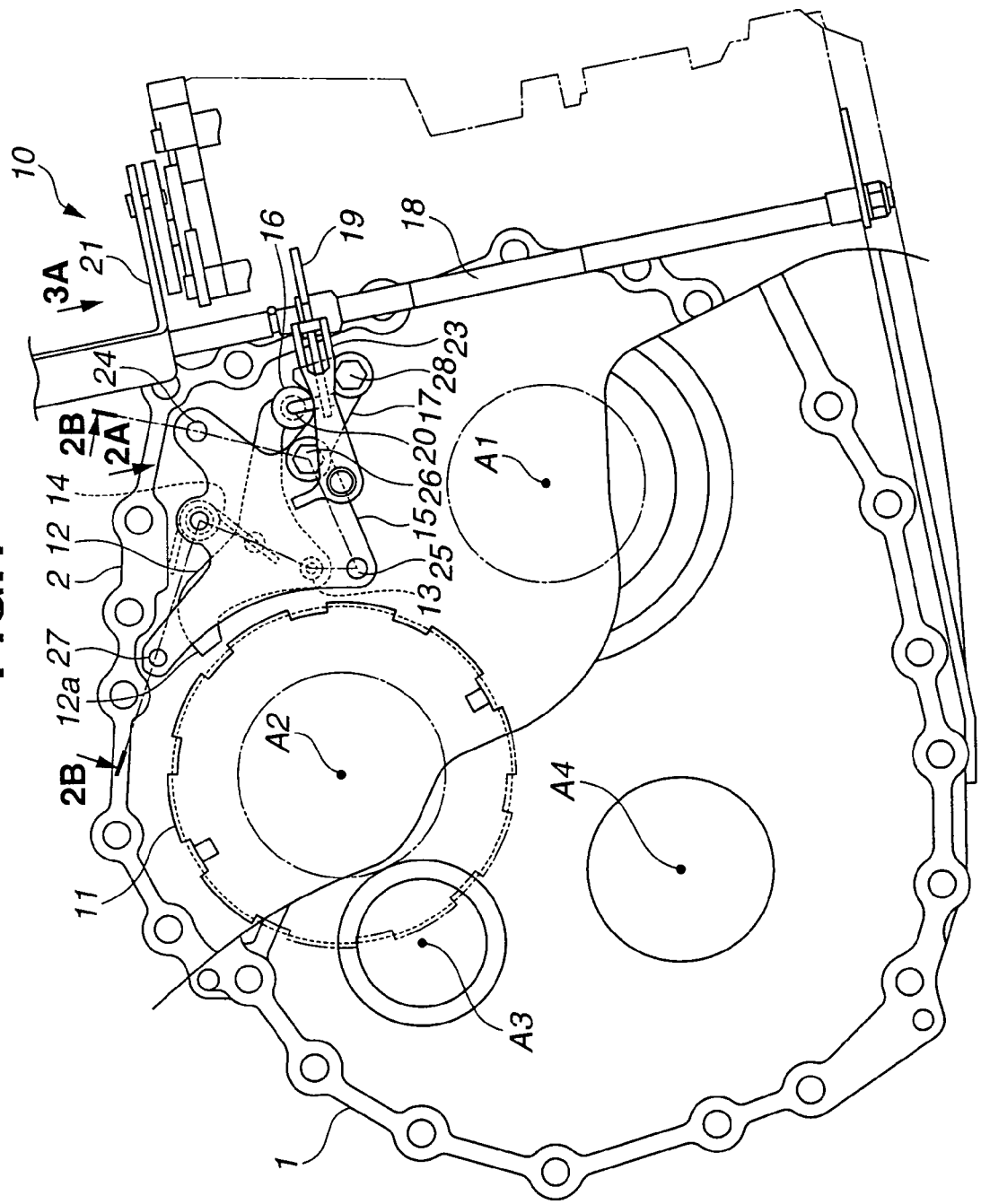
FIG. 1 is a view showing a connection part between a casing and a side cover of a belt-type continuously-variable transmission according to a first embodiment of the present invention.

FIGS. 1, 2(2A, 2B) and 3(3A, 3B) show a belt-type continuously-variable transmission according to a first embodiment of the present invention.

Figure 7:
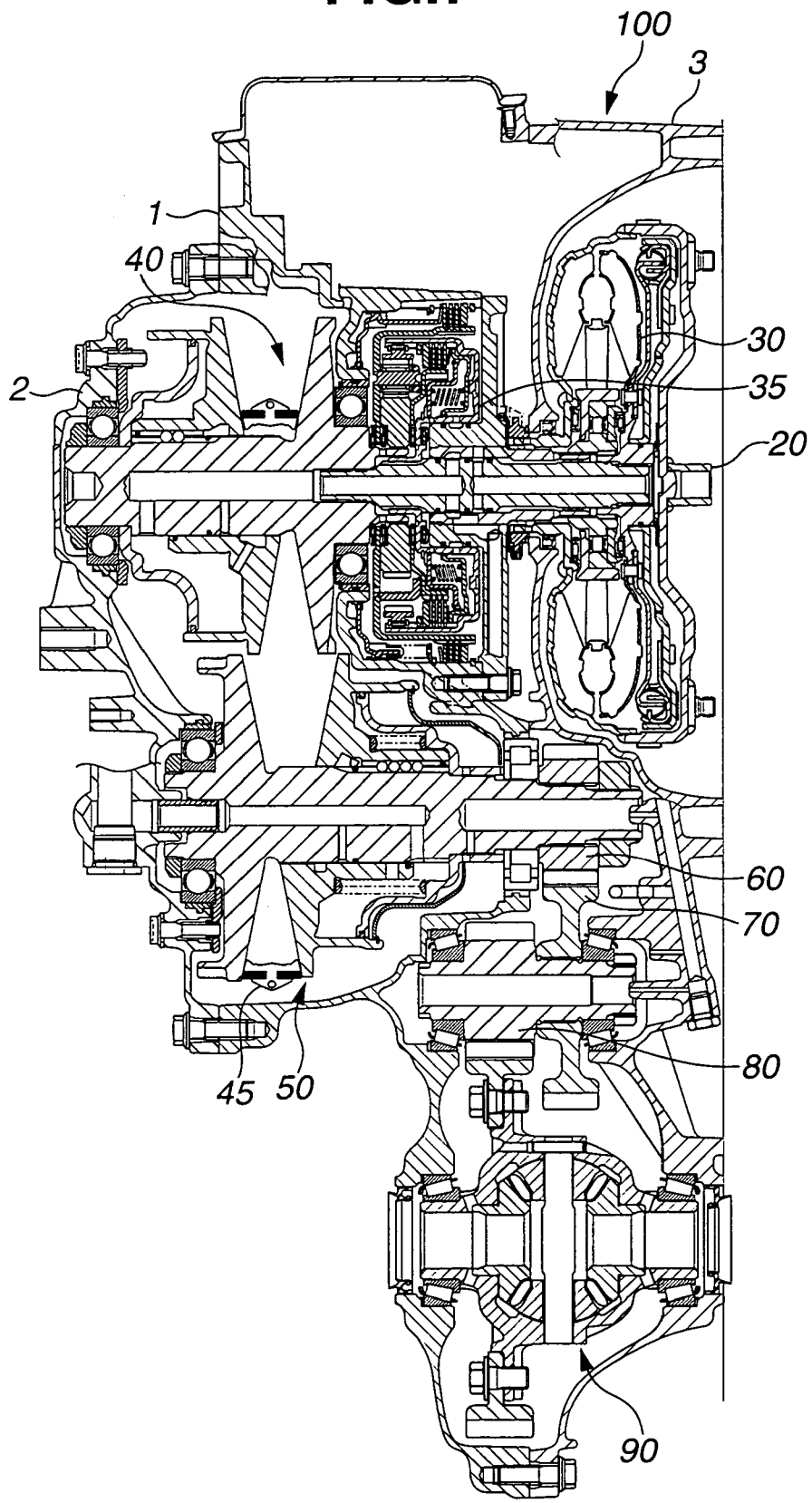
FIG. 7 is a sectional view showing a transmission case and a transmission mechanism which can be employed for the belt-type continuously-variable transmission of each of the illustrated embodiments.

FIG. 7 shows the overall arrangement of a belt-type continuously-variable transmission which can be employed in the first embodiment. This arrangement is basically identical to the arrangements disclosed in the patent documents mentioned above, except a parking mechanism. The belt-type continuously-variable transmission shown in FIG. 1 includes a motion transmitting device 30, a primary (or driving) pulley 40, a secondary (or driven) pulley 50, an output gear 60, an idler gear 70, a final drive gear 80, and a differential mechanism 90, which are enclosed in a casing assembly or transmission case 100. The motion transmitting device 30 (such as a torque converter or an electromagnetic clutch) is disposed on a first axis (A1 shown in FIG. 1) and aligned with an output shaft 20 of an engine. The motion transmitting device 30 is located axially between the engine and the primary pulley 40, and connected to transmit rotation of the output shaft 20 of the engine to the primary pulley 40. The primary pulley 40 is disposed on the first axis (A1), and drivingly connected with the motion transmitting device 30 so that the primary pulley 40 is driven by the motion transmitting device 30.

The secondary pulley 50 is disposed on a second axis (A2 shown in FIG. 1) which is parallel to the first axis (A1), and is connected with the primary pulley 40 by a belt 45. The secondary pulley 50 is composed of an axially fixed sheave and an axially movable sheave. The output gear 60 is disposed on the second axis (A2), and connected with the secondary pulley 50 so that the output gear 60 rotates as a unit with the secondary pulley 50. The idler gear 70 is disposed on a third axis (A3 shown in FIG. 1), and engaged with the output gear 60. The final drive gear 80 is disposed on the third axis (A3), and connected to rotate as a unit with the idler gear 70. The differential mechanism 90 is disposed on a fourth axis (A4 shown in FIG. 1), and driven by the final drive gear 80.

The casing assembly or transmission case 100 includes a casing 1, a side cover 2, and a housing 3. The side cover 2 is placed on a first side (the left side as viewed in FIG. 7) of the casing 1, and the housing 3 is placed on a second side (the right side in FIG. 7) of the casing 1. The casing 1 is placed between the housing 3 on the second side closer to the engine, and the side cover 2 on the first side remoter from the engine. The belt drive composed of the primary and secondary pulleys 40 and 50 connected by the belt 45 is placed between the side cover 2 which is located on the first side (left in FIG. 7), and the motion transmitting device 30 and the output gear 60 which are both located on second side (right in FIG. 7) of the belt drive. The belt 45 is disposed between the axially movable sheave of the secondary pulley 50 which is located on the second (right) side of the belt 45, and the fixed sheave of the secondary pulley 50 which is located on the first (left) side of the belt 45.

A parking mechanism 10 according to the first embodiment is shown in FIG. 1 which is a view showing a joint or connecting part between the casing and the side cover, as viewed from a casing's side. The parking mechanism 10 includes a parking gear 11 formed on an outer surface of the fixed sheave of the secondary pulley 50; a parking pawl 12 engageable with the parking gear 11; a pawl shaft 13 (a support member) swingably supporting the parking pawl 12; a return spring 14 urging the parking pawl 12 to an unlocking position; a cover plate 15 preventing the parking pawl 12 and the return spring 14 from falling off; a cam 16 driving (actuating) the parking pawl 12; a guide member 17 holding and guiding the lower surface of the cam 16; and a cam shaft 20 transmitting motion of a swingable plate 19 mounted on a manual shaft 18, to the cam 16.

The manual shaft 18 extends to an upper end attached to a manual lever 21 (shown in FIGS. 1 and 3A), and swings with the manual lever 21. The manual lever 21 is connected through a control cable 22 (shown in FIG. 3A) to a select lever (not shown) of a vehicle, and the manual lever 21 swings in accordance with operation of the select lever. The swingable plate 19 has an outer edge formed with a plurality of recesses (shown in FIG. 2A) each receiving a forward end of a plate spring 23 in accordance with a corresponding one of the shift positions of the select lever. The engagement of the end of the plate spring 23 in each recess determines the position of the swingable plate 19 in accordance with the position of the select lever, and provides click feeling at each shift position of the select lever. When the select lever is shifted to the parking position, the end of the plate spring 23 engages with a recess P (shown in FIG. 2A) of the swingable plate 19.

The parking pawl 12 is supported on the pawl shaft 13 (a support member) so that the parking pawl 12 is swingable about the pawl shaft 13. The parking pawl 12 is disposed between an inner surface of the side cover 2 and the cover plate 15. The parking pawl 12 has a first end formed with an engaging portion 12a (shown in FIG. 1) engageable with teeth of the parking gear 11, and a second end abutting on an upper surface of the cam 16 by an urging force of the return spring 14.

The pawl shaft 13 has a first end inserted into a bottomed hole (a non-penetration hole) formed in the side cover 2, and a second end inserted into a bottomed hole formed in the cover plate 15. Thus, the pawl shaft 13 is supported at the first end by the side cover 2, and at the second end by the cover plate 15 so that the pawl shaft 13 can not fall off.

The return spring 14 is a coil spring mounted on a projecting portion 2a (a spring shaft) formed in the side cover 2. As shown FIG. 2B, a first end of the return spring 14 is fixed to the inner surface of the side cover 2 by pressure welding. A second end of the return spring 14 is inserted through a through hole 12b formed in the parking pawl 12, and thereby retained by the parking pawl 12. Therefore, the return spring 14 urges the parking pawl 12 in a clockwise direction in FIG. 1 (in a direction to press the cam 16). The cover plate 15 is positioned on the inner surface of the side cover 2 by position pins 24 and 25, and fixed to the side cover 2 by bolts 26 and 27.

The cam 16 is mounted on a forward end of the cam shaft 20. The cam 16 is tapered, and the diameter of the cam 16 is smaller toward the forward end. As shown in FIG. 3B, a base end of the cam shaft 20 is connected with the swingable plate 19. The cam shaft 20 and the cam 16 move forward and backward in the axial direction of the cam 16 (substantially in an up-down direction in FIG. 2A) in response to the swing motion of the swingable plate 19. The guide member 17 is disposed between the side cover 2 and the cover plate 15 so as to be flush with the parking pawl 12 in the axial direction of the cam 16. The guide member 17 is positioned on and fixed to the inner surface of the side cover 2 by the bolts 26 and 28. The upper surface of the guide member 17 is slidably disposed on the lower surface of the cam 16 opposite to the upper surface of the cam 16 on which the parking pawl 12 abuts.

Figure 2A:
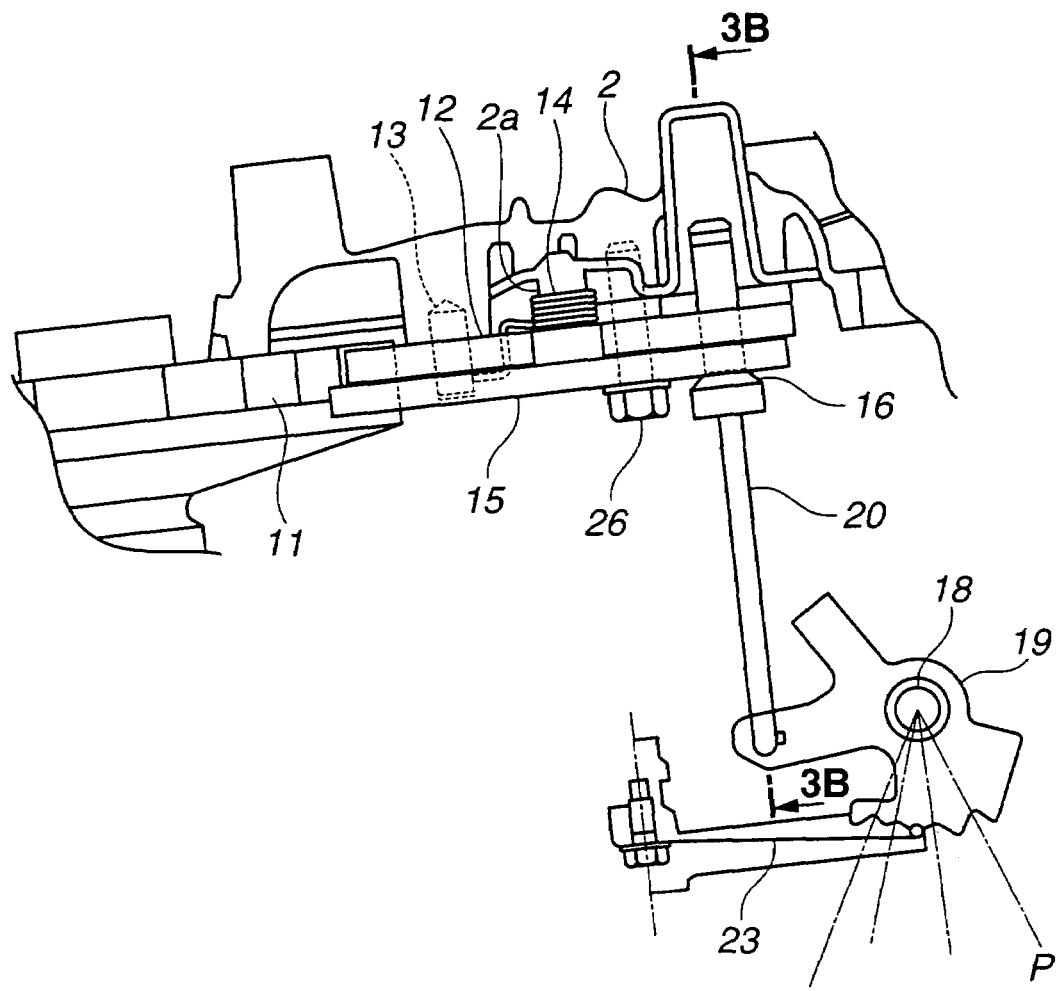
FIG. 2A is a view as viewed from a direction shown by an arrow 2A in FIG. 1.
Figure 3A:
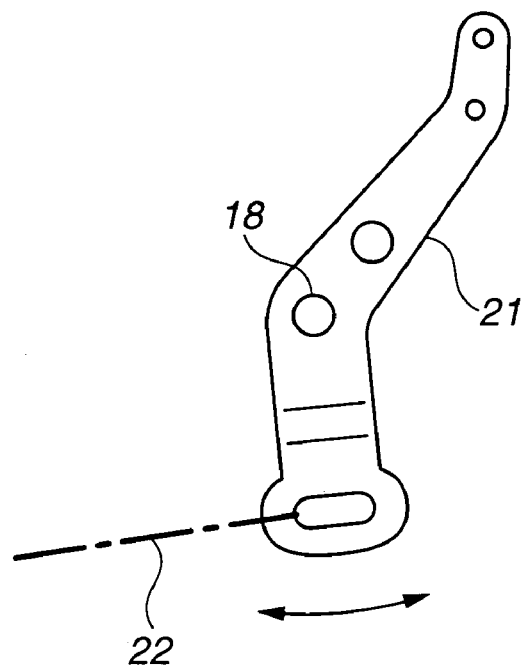
FIG. 3A is a view as viewed from a direction shown by an arrow 3A in FIG. 1.
Figure 3B:
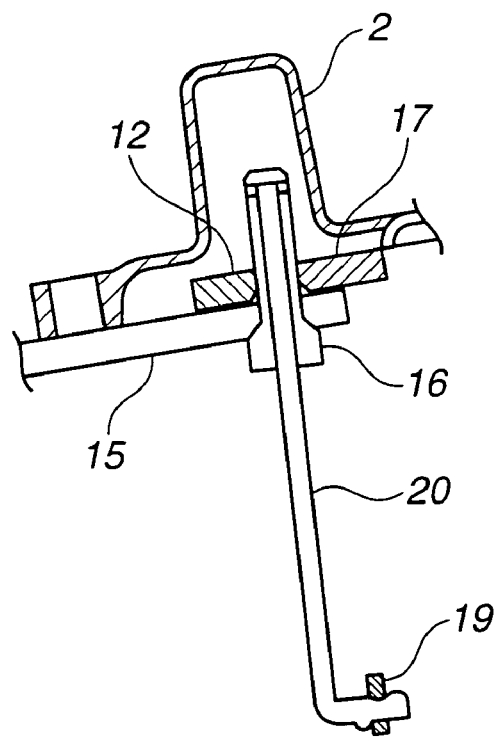
FIG. 3B is a sectional view taken along a section line of 3B-3B of FIG. 2A.

As shown in FIGS. 2A and 3B, when the select lever is out of the parking position (in a non-parking state), a smaller diameter portion of the cam 16 presses the second end of the parking pawl 12. Therefore, the parking pawl 12 is held in the unlocking (or release) position (as shown in FIG. 1) in which the engaging portion 12a is away from the teeth of the parking gear 11. Conversely, when the select lever is shifted to the parking position in which the end of the plate spring 23 engages with the recess P of the swingable plate 19 (in a parking state), the cam shaft 20 and the cam 16 move forward in the axial direction, and a larger diameter portion of the cam 16 presses the second end of the parking pawl 12 and the guide member 17. By the movement of the pressing position from the smaller diameter portion to the larger diameter portion of the cam 16, the parking pawl 12 is pushed in the radial direction of the cam 16 (in the counterclockwise direction in the FIG. 1) against the urging force of the return spring 14. Thereby, the parking pawl 12 is swung to the locking position in which the engaging portion 12a engages with the teeth of the parking gear 11, and held in the locking position.

In the belt-type continuously-variable transmission according to the first embodiment, the return coil spring 14 is mounted on the projecting portion 2a (the spring shaft) extending in parallel to the pawl shaft 13. Therefore, it is possible to reduce the whole length of the pawl shaft 13 supporting the parking pawl 12, and hence to reduce the size of the parking mechanism (at least the structure around the parking pawl 12) in the axial direction. The position of the parking mechanism can be set at an optimum position without interference with nearby mechanism and parts. In the illustrated example, the parking gear 11 is formed on the outer surface of the fixed sheave of the secondary pulley 50, and therefore the pawl shaft 13 needs to be disposed near the belt wound around the pulley for the function of the parking pawl 12 (as shown in FIG. 1). In the first embodiment, it is possible to dispose the parking pawl 13 near the belt without interference with parts (e.g. interference between the belt and the return spring).

In the first embodiment, at least the parking pawl 12, the pawl shaft 13 (the support member for the parking pawl 12), and the return spring 14 can be incorporated in the side cover 2 without being mounted in the casing 1 and the housing 3, prior to the assembly operation of the side cover 2 and the casing 1. The assembly operation needs not to be carried out simultaneously with the mounting operation of the parts such as the parking pawl 12, the pawl shaft 13, and the return spring 14. Therefore, it is possible to achieve the mounting operation of the parts such as the parking pawl 12 easily, reliably, and separately from the assembly operation, and hence this arrangement is advantageous for the assembly operation.

Figure 2B:
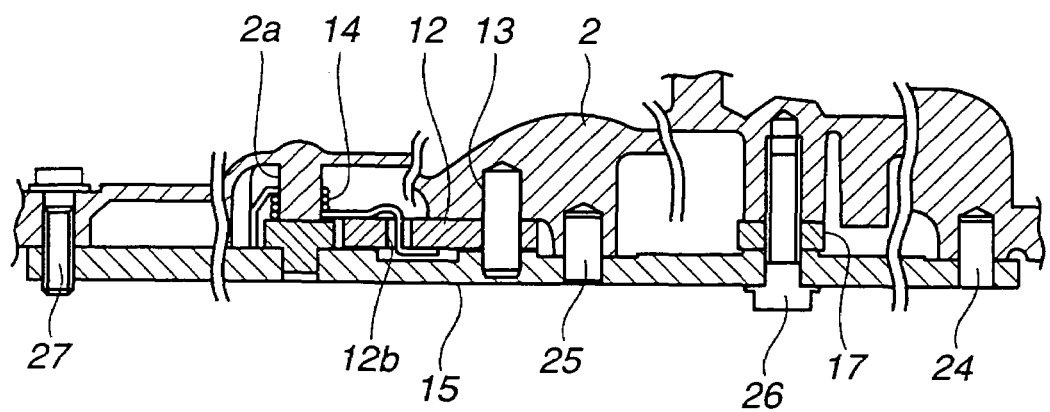
FIG. 2B is a sectional view taken along a section line of 2B-2B of FIG. 1.

As shown FIG. 2B, the pawl shaft 13 and the return spring 14 are both retained at two separate positions, by the cover plate 15 alone so as to prevent them from falling off. Therefore, as compared with the arrangement using two cover members to prevent the pawl shaft 13 and the return spring 14 from falling off, the arrangement of the first embodiment is advantageous for the reduction of the number of parts and the cost reduction. Moreover, the parking gear 11 is formed integrally in the secondary pulley 50. Therefore, as compared with the arrangement in which the parking gear and the secondary pulley are two separate member, this arrangement is effective for further reducing the number of parts, reducing the cost, and reducing the size in the axial direction.

Figure 4:
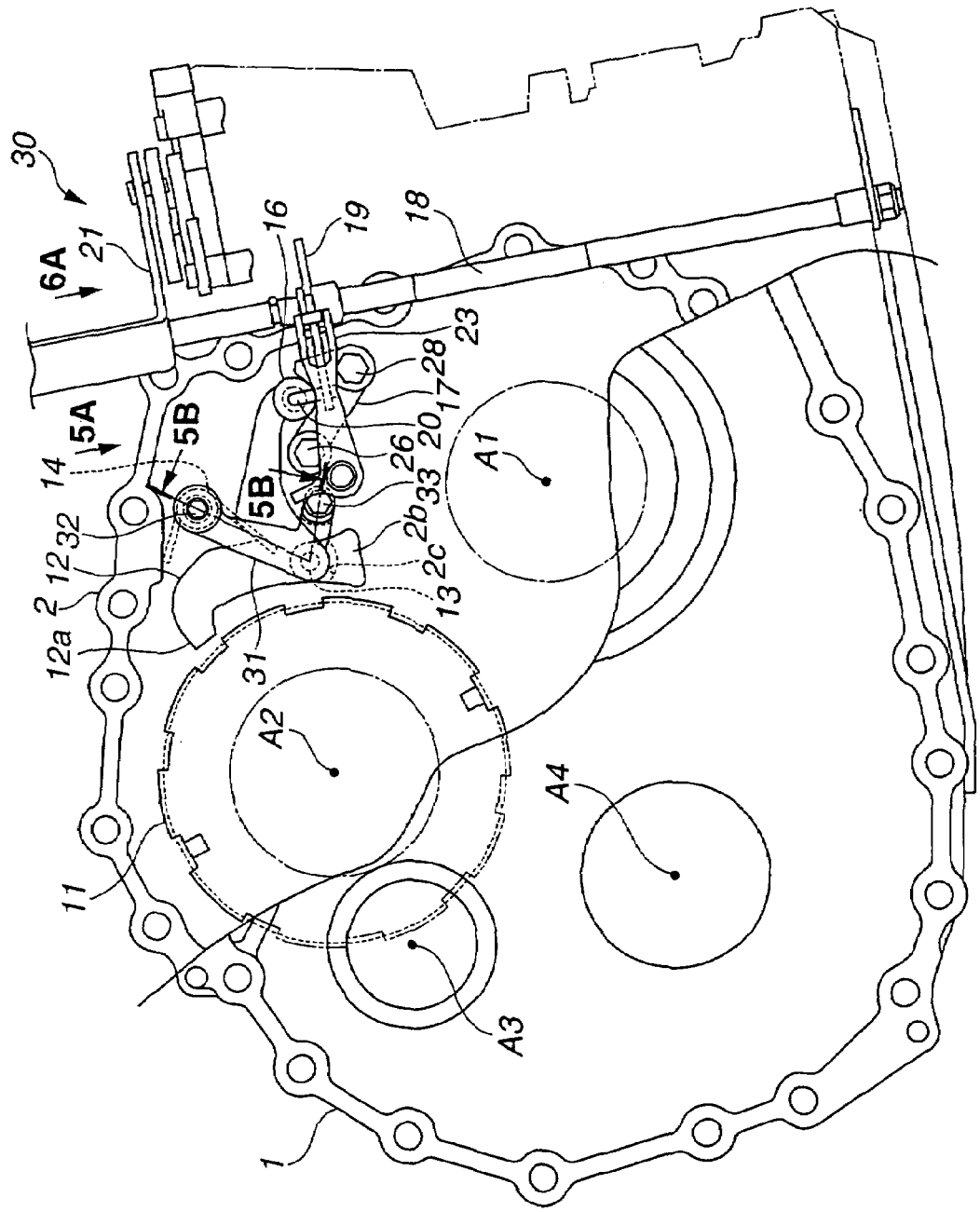
FIG. 4 is a view showing a connection part between a casing and a side cover of a belt-type continuously-variable transmission according to a second embodiment of the present invention.

FIGS. 4, 5(5A, 5B) and 6(6A, 6B) show a belt-type continuously-variable transmission according to a second embodiment of the present invention.

FIG. 4 is a view showing the connection or joint part between the casing 1 and the side cover 2, as viewed from the casing's side. The continuously-variable transmission according to the second embodiment can employ the layout of the component parts shown in FIG. 7, as in the first embodiment. The arrangement of FIG. 4 is substantially identical to the arrangement of FIG. 1 in most aspects as shown by the use of the same reference numerals.

A parking mechanism 30 according to the second embodiment includes the parking gear 11 integral with the secondary pulley 50 as in the first embodiment; the parking pawl 12 engageable with the parking gear 11; the pawl shaft 13 (the support member) swingably supporting the parking pawl 12; the return spring 14 urging the parking pawl 12 to the unlocking position; a cover plate 31 preventing the parking pawl 12 and the return spring 14 from falling off; the cam 16 driving the parking pawl 12; the guide member 17 holding the lower surface of the cam 16; and the cam shaft 20 transmitting motion of the swingable plate 19 mounted on the manual shaft 18, to the cam 16.

Figure 5A:
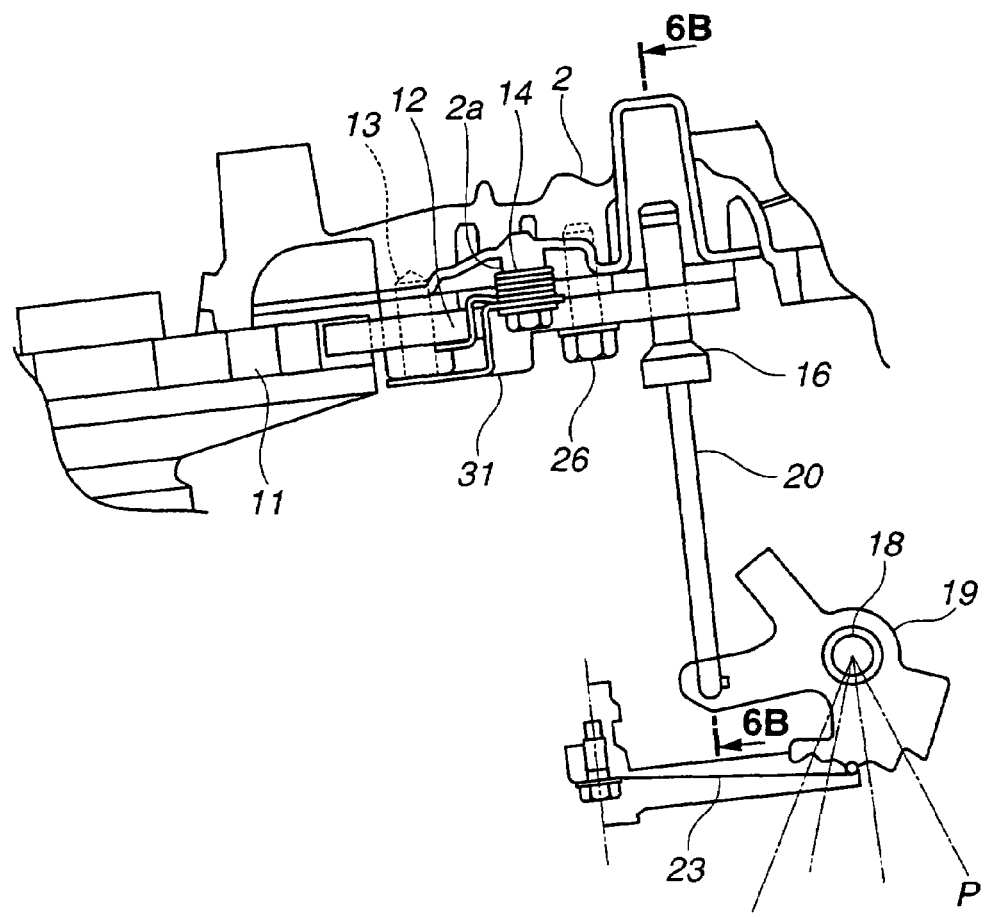
FIG. 5A is a view as viewed from a direction shown by an arrow 5A in FIG. 4.
Figure 5B:
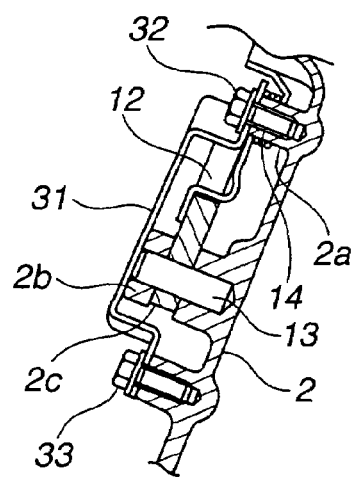
FIG. 5B is a sectional view taken along a section line of 5B-5B of FIG. 4.

In this parking mechanism according to the second embodiment, as shown in FIGS. 4 and 5B, the side cover 2 has an L-shaped projection or portion 2b projecting from the inner surface of the side cover 2. The L-shaped projection 2b includes a projecting portion projecting from a base portion of the side cover 2, toward the cover plate 31, and a support end portion projecting from the end of the projecting portion so as to form an angle. The base portion and the support end portion confront each other across a hollow groove 2c. The support end portion of the L-shaped projection 2b is formed with a through hole through which the pawl shaft 13 is inserted. The base portion of the side cover 2 is formed with a bottomed hole receiving the first end of the pawl shaft 13. Therefore, the pawl shaft 13 is supported, at the first end, by the base portion, and, at the second end, by the support end portion. A lower portion (an intermediate portion) of the parking pawl 12 is received in the hollow groove 2c. The parking pawl 12 is swingably supported on the pawl shaft 13 which is inserted through the through hole of the support end portion so as to pass through the lower portion of the parking pawl 12. The cover plate 31 is arranged to cover the second end of the pawl shaft 13, the support end portion of the L-shaped projection 2b, and the end of the projecting portion 2a (the spring shaft), and fixed to the side cover 2 by bolts 32 and 33. Thus, the pawl shaft 13 and the return spring 14 are supported reliably between the side cover 2 and the cover plate 31.

Figure 6A:
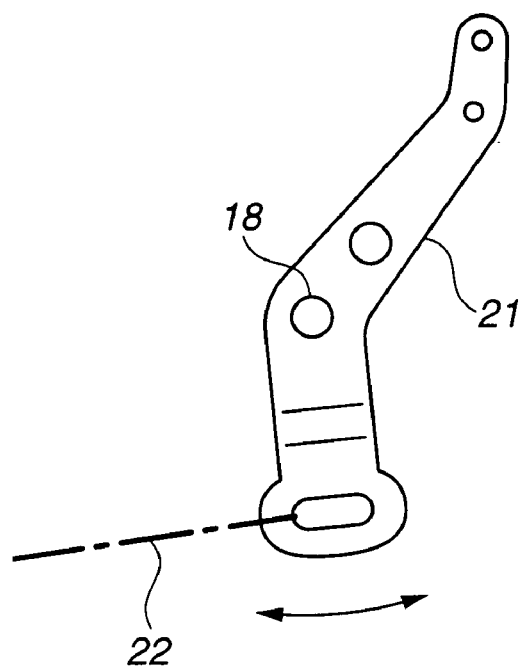
FIG. 6A is a view as viewed from a direction shown by an arrow 6A in FIG. 4.
Figure 6B:
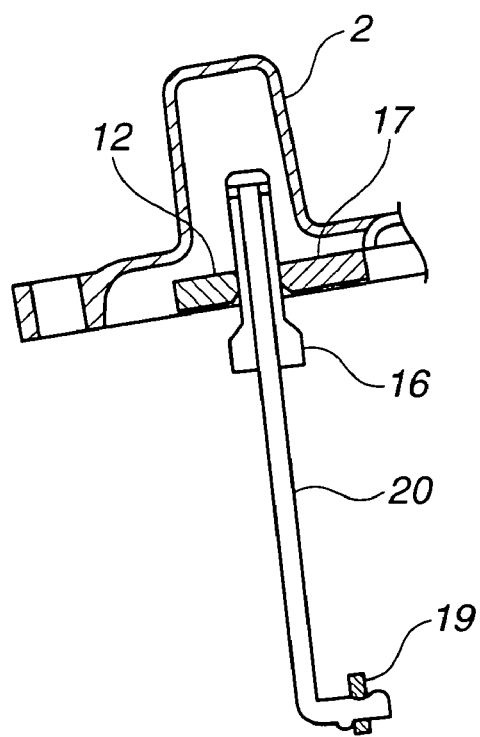
FIG. 6B is a sectional view taken along a section line of 6B-6B of FIG. 5A.

The parking mechanism 30 according to the second embodiment is operated in the same manner as the parking mechanism 10 of the first embodiment. As shown in FIGS. 5A and 6B, when the select lever is out of the parking position (in the non-parking state), the smaller diameter portion of the cam 16 abuts on the second end of the parking pawl 12. The parking pawl 12 is held in the unlocking position (in the position shown in FIG. 4) in which the engaging portion 12a is away from the teeth of the parking gear 11. Conversely, when the select lever is shifted to the parking position, the end of the plate spring 23 engages with the recess P of the swingable plate 19 (in the parking state), the cam shaft 20 and the cam 16 move forward in the axial direction, and the larger diameter portion of the cam 16 abuts on the second end of the parking pawl 12 and the guide member 17. By the shift of the abutment position from the smaller diameter portion to the larger diameter portion, the parking pawl 12 is pushed in the radial direction of the cam 16 (counterclockwise direction in the FIG. 4) against the urging force of the return spring 14. Thereby, the parking pawl 12 swings into the locking position in which the engaging portion 12a is engaged with the teeth of the parking gear 11, and held in the locking position.

In the belt-type continuously-variable transmission according to the second embodiment, like the first embodiment, the return spring 14 is mounted on the projecting portion 2a (the spring shaft) extending side by side with the pawl shaft 13. Therefore, the whole length of the pawl shaft 13 supporting the parking pawl 12 can be reduced, and the parking mechanism is advantageous for reducing the size in the axial direction. Moreover, the parking mechanism has a compact and optimum arrangement capable of reducing or eliminating the possibility of interference with other mechanisms or other members. In this arrangement, at least the parking pawl 12, the support member or pawl shaft 13 for the parking pawl 12, and the return spring 14 are supported only on the side cover 2 without being supported by the casing 1 and the housing 3, so that this arrangement is advantageous for the assembly operation.

As shown FIG. 5B, the pawl shaft 13 and the return spring 14 are both retained at two separate positions, only by the cover plate 15, as in the first embodiment. Therefore, as compared with the arrangement using two cover members to prevent the pawl shaft 13 and the return spring 14 from falling off, the arrangement of the second embodiment is advantageous for the reduction of the number of parts and the cost reduction. Moreover, the parking gear 11 is formed integrally in the secondary pulley 50. Therefore, this arrangement is effective for further reducing the number of parts, reducing the cost, and reducing the size in the axial direction.

Furthermore, it is optional to employ the arrangement in which the parking gear is located at a position adjacent to the secondary pulley, as a member separate from the secondary pulley. However, the parking gear 11 integral with the secondary pulley as in the first and second embodiments is more advantageous for reducing the number of parts, the cost, and the size in the axial direction.

This application is based on a prior Japanese Patent Application No. 2004-097883 filed on Mar. 30, 2004, and a prior Japanese Patent Application No. 2004-097884 filed on Mar. 30, 2004. The entire contents of these Japanese Patent Applications No. 2004-097883 and No. 2004-097884 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A continuously-variable transmission comprising:
   a primary pulley;
   a secondary pulley connected with the primary pulley by a belt;
   a parking gear;
   a casing enclosing the primary pulley, the secondary pulley and the parking gear; and
   a side cover subassembly including:
      a side cover joined with the casing;
      a parking pawl arranged to engage with the parking gear, and mounted on the side cover;
      a support member arranged to support the parking pawl, and mounted on the side cover; and
      a return spring mounted on the side cover,
   wherein the subassembly further comprises a cover plate fixed to the side cover, and arranged to hold the support member.

2. The continuously-variable transmission as claimed in claim 1, wherein the subassembly is a structural unit which contains the side cover, the parking pawl, the support member and the return spring in an assembled state independently from the casing, and which is adapted to be joined as a unit to the casing.

3. The belt-type continuously-variable transmission as claimed in claim 1, wherein the cover plate holds the return spring on the side cover.

4. The continuously-variable transmission as claimed in claim 1, wherein the subassembly includes a spring shaft on which the return spring is mounted; the spring shaft is formed in one of the side cover and the cover plate; and the support member and the spring shaft extend along each other.

5. The continuously-variable transmission as claimed in claim 4, wherein the support member is a support shaft extending in an axial direction of the secondary pulley, from the side cover to the cover plate.

6. The continuously-variable transmission as claimed in claim 4, wherein the support member is a support shaft including a first shaft end supported by the side cover, and a second shaft end supported by at least one of the side cover and the cover plate.

7. The continuously-variable transmission as claimed in claim 1, wherein the parking pawl, the support member, and the return spring are enclosed between the side cover and the cover plate which extends substantially in a plane to which a rotation axis of the secondary pulley is perpendicular.

8. The continuously-variable transmission as claimed in claim 1, wherein the parking gear and the parking pawl form a parking mechanism to lock and unlock rotation of the secondary pulley; and wherein the parking gear is coaxial and integral with the secondary pulley.

9. A continuously-variable transmission comprising:
   a primary pulley;
   a secondary pulley connected with the primary pulley by a belt;
   a parking gear;
   a casing enclosing the primary pulley, the secondary pulley and the parking gear; and
   a side cover subassembly including:
      a side cover joined with the casing;
      a parking pawl arranged to engage with the parking gear, and mounted on the side cover;
      a support member arranged to support the parking pawl, and mounted on the side cover; and
      a return spring mounted on the side cover,
   wherein the parking gear is coaxial and integral with the secondary pulley.

10. The continuously-variable transmission as claimed in claim 1, wherein the return spring is disposed between the parking pawl and one of the side cover and the cover plate.

11. The continuously-variable transmission as claimed in claim 1, wherein the side cover supports a first end of the support member in a the form of a shaft, and the cover plate supports a second end of the support member.

12. The continuously-variable transmission as claimed in claim 11, wherein the side cover is formed with a bottomed hole receiving the first end of the support member, and the cover plate is formed with a bottomed hole receiving the second end of the support member.

13. The continuously-variable transmission as claimed in claim 1, wherein the side cover supports both of first and second ends of the support member which is in a form of a shaft.

14. The continuously-variable transmission as claimed in claim 13, wherein the side cover includes a base portion formed with a hole receiving the first end of the support member, and a support portion formed with a hole receiving the second end of the support member.

15. The continuously-variable transmission as claimed in claim 14, wherein the side cover further includes a projecting portion projecting from the base portion to the support portion in a direction toward the cover plate, the support portion projects from the projecting portion, the hole of the side cover is a bottomed hole, the hole of the support portion is a through hole, and the parking pawl is located between the base portion and the support portion.

16. The continuously-variable transmission as claimed in claim 6, wherein the side cover includes a spring shaft projecting to an end toward the cover plate and supporting the return spring; and the cover plate is arranged to cover the second end of the support shaft, and the end of the spring shaft, to limit axial movement of the support shaft and the return spring.

17. A continuously-variable transmission comprising:
   a primary pulley;
   a secondary pulley connected with the primary pulley by a belt;
   a parking gear;
   a casing enclosing the primary pulley, the secondary pulley and the parking gear; and
   a side cover subassembly including:
      a side cover joined with the casing;

a parking pawl arranged to engage with the parking gear, and mounted on the side cover;

a support member arranged to support the parking pawl, and mounted on the side cover; and a return spring mounted on the side cover, wherein the continuously-variable transmission further comprises:

a motion transmitting device disposed on a first axis on which the primary pulley is disposed, and connected with the primary pulley to drive the primary pulley with torque from an engine; and an output gear disposed on a second axis on which the secondary pulley is disposed, and connected with the secondary pulley to rotate as a unit with the secondary pulley;

wherein the side cover and the parking gear are placed on a first side of the belt connecting the primary and secondary pulleys whereas the motion transmitting device and the output gear are placed on a second side of the belt so that the belt is located between the side cover on the first side and the output gear on the second side, and the parking gear is located between the side cover and the belt.

18. A continuously-variable transmission comprising:

a primary pulley;

a secondary pulley connected with the primary pulley by a belt;

a parking gear;

a casing enclosing the primary pulley, the secondary pulley and the parking gear;

a parking pawl arranged to engage with the parking gear, and mounted on a side cover;

a pawl shaft arranged to support the parking pawl, and mounted on the side cover;

a return spring which is a coil spring to urge the parking pawl in a direction disengaging from the parking gear; and the side cover which is joined with the casing, and arranged to support the pawl shaft, and which includes a spring shaft extending along the pawl shaft, and supporting the return spring.

19. The continuously-variable transmission as claimed in claim 18, wherein the continuously-variable transmission further comprises a cover plate which is fixed to the side cover, to cover ends of the pawl shaft and the spring shaft.

20. The continuously-variable transmission as claimed in claim 1, wherein the cover plate comprises a bottomed hole to hold the support member.

\* \* \* \* \*